UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY MATERIAL AND PROCESS OF MAKING IT.

1,362,316.  Specification of Letters Patent.  Patented Dec. 14, 1920.

No Drawing.  Application filed January 7, 1920. Serial No. 349,979.

*To all whom it may concern:*

Be it known that I, OTIS HUTCHINS, a citizen of the United States, residing at Niagara Falls, Niagara county, New York, have invented a new and useful Improvement in Refractory Material and Processes of Making It, of which the following is a full, clear, and exact description.

This invention relates to a new highly refractory material and process of making it. This material consists of a mixture of zirconia and alumina in varying proportions, which has been formed into shaped articles by any of the well known methods and then burnt at a high temperature.

Various forms of alumina have heretofore been used as a refractory with considerable success. In the amorphous state, it has been used extensively in the form of bauxite brick. Crystallized aluminous materials containing upward of 80% alumina, made by fusion in the electric furnace of bauxite or other aluminous material, have been used in the form of shaped articles or cements. The bonding material usually employed for binding together the grains of crystallized aluminous material has been some variety of refractory clay.

The above types of aluminous refractories possess certain characteristics which limit their usefulness in the arts. They have a marked tendency to crack and spall when subjected to sudden changes of temperature, which necessitates restricting their uses to locations where temperature changes are reduced to a minimum. The use of a clay binder also has certain disadvantages when the refractory is used in contact with certain basic slags or glasses.

I have discovered that mixtures of aluminous materials and zirconia, when formed into a refractory body and burnt, have a very considerable resistance to cracking and spalling when subjected to sudden changes of temperature. This new refractory material also possesses marked chemical inactivity at high temperatures when in contact with corrosive slags.

In the preferred method of practising my invention, I form into shaped bodies, by any well known method, a mixture of about 90% of crystallized aluminous material and about 10% of zirconia. These bodies are burned at a high temperature in any kiln of suitable design. The resulting burned articles are extremely hard and dense and possess a marked resistance against fracture. For the crystallized aluminous material I prefer to use a "run of crusher" product of No. 24 mesh and finer and containing upward of 90% alumina. This aluminous material should be substantially free of metallic impurities. For the zirconia I prefer to use a product known as "zirkite cement," which consists of a zirconium ore containing about 75% zirconium oxid, ground to a fine state of subdivision but this may be replaced by other oxids of zirconium found in the trade.

The specifications above given may be modified very materially to produce articles most desirable for different applications. A very satisfactory refractory body can be produced from mixtures of zirconia and aluminous "fines" a by-product of the abrasive industry. In certain cases it is desirable to introduce into the above mixture some coarser aluminous material in order to lessen spalling. The zirconia content may consist of coarsely ground zirconium ore, purified zirconium oxid or electrically fused zirconium ore or oxid. The aluminous material may consist of amorphous or crystallized alumina. The amorphous alumina may be in the form of pure alumina, bauxite or other aluminous ore such as diaspore. The crystallized alumina may be in the form of fused bauxite or other crystallized alumina material containing from 80% to 100% of alumina. The relative proportions of alumina and zirconia may vary greatly and satisfactory products can be made containing from 5% to 75% zirconia.

This invention finds a wide application in the manufacture of bricks for the glass industry, the metal working industry, and other arts where high refractability and resistance to chemical action is required. It is also useful in the manufacture of crucibles, muffles and various furnace linings.

I claim:

1. As a new article of manufacture, a highly refractory material consisting essentially of a burnt mixture of zirconia and alumina.

2. As a new article of manufacture, a highly refractory material consisting essentially of a burnt mixture of zirconia and crystallized alumina.

3. As a new article of manufacture, a highly refractory material consisting of a burnt mixture of zirconia and aluminous material.

4. As a new article of manufacture, a highly refractory material consisting essentially of a burnt mixture containing 5 to 75% zirconia and alumina.

5. As a new article of manufacture, a highly refractory material consisting essentially of a burnt mixture of crystallized zirconia and alumina.

6. As a new article of manufacture, a refractory body composed essentially of alumina and zirconia in the proportion of about ninety per cent. of alumina and about ten per cent. of zirconia.

7. As a new article of manufacture, a shaped refractory body consisting essentially of alumina having a binder of zirconia.

8. The process of making highly refractory articles, which consists in mixing zirconia and alumina, forming the mixture into shaped articles, and burning the shaped article.

9. The process of making highly refractory articles, which consists in making a mixture of zirconia and alumina in which the particles of alumina are coarser than those of the zirconia, forming the mixture into shaped articles, and burning the shaped article.

10. As a new article of manufacture, a highly refractory material consisting essentially of a burned mixture of oxygen-containing zirconium compound and alumina.

11. As a new article of manufacture, a highly refractory material consisting essentially of a burned mixture of zirconium compound, composed principally of the oxygen-containing compounds of zirconium, and an aluminous material.

In testimony whereof, I have hereunto set my hand.

OTIS HUTCHINS.